Patented Jan. 13, 1953

2,625,523

UNITED STATES PATENT OFFICE 2,625,523

POLYMER COMPOSITION AND PROCESS OF PREPARING SAME

John D. Garber and William J. Sparks, Cranford, N. J., assignors to Standard Oil Development Company, a corporation of Delaware No Drawing. Application July 17, 1945, Serial No. 605,631

3 Claims. (Cl. 260—23.7)

This invention relates to low temperature olefinic polymers; relates particularly to low temperature interpolymers which are relatively high in diolefin content; and relates especially to the heat treatment, heat bodying and cyclicization of olefinic polymers as a solid or in solution.

It has been found possible to prepare an interpolymer of a diolefin or multi-olefin such as butadiene or substituted butadienes with a wide range of olefinic copolymers in which the diene is present in major proportion, by a low temperature polymerization using a Friedel-Crafts catalyst, to yield a thermoplastic polymer of moderately high unsaturation.

According to the present invention, it is now found that such high diolefin copolymers are soluble in a wide range of liquids, both petroleum hydrocarbons and the drying oils, and when so dissolved, as well as when in solid, undissolved form, the polymer can be heat-bodied or further polymerized by a heat treatment to reduce the unsaturation and to increase the thickening power and body; and reduce the solubility.

This procedure is particularly advantageous when the polymer is dissolved in a drying oil such as linseed oil. The polymer is light in color, from a pale yellow to a clear water-white color, depending upon the purity of raw materials and the freedom from metal contaminants and it has very good color and heat stability. Furthermore, in solution, as in linseed oil, the same heat-bodying occurs without interference with the heat-bodying of the linseed oil, and the two procedures occur simultaneously, at approximately the same temperature to yield a very excellent paint base or varnish composition in which the linseed oil dries by oxidation from atmospheric oxygen and the heat-bodied polymer dries simultaneously by oxidation in a somewhat analogous reaction; all of these reactions proceeding without discoloration of either the linseed oil or the polymer, to yield an exceedingly durable varnish or paint base. The bodying reaction of both the oil and the resin is predominantly effected by carbon to carbon bond reaction and is at least partially, and, in many cases, almost wholly an inter-reaction involving creation of such new linkages between oil and resin.

A similar heat-bodying reaction occurs when the polymer is dissolved in other oils such as the petroleum hydrocarbons. A solution of the copolymer may be prepared in a medium-weight naphtha, heat bodied at a temperature just below the boiling point of the naphtha and then the bodied mixture cut back by the addition of still more naphtha, preferably a lighter naphtha, to yield an excellent surface-covering compound which dried in the first instance by the volatilization of the light naphtha, and thereafter, secondarily, by oxidation of the bodied copolymer, to yield a hard, tough, durable, not brittle, but slightly elastic coating film.

Alternatively, the solid polymer may be partially heat bodied, alone, in the presence of one or more of a wide range of pigments or fillers, which this procedure yields a partly hardened material which may be regarded as a "biscuit" or preformed mold charge for the making of thermosetting molded articles.

It may be noted that low temperature polymers of butadiene only are insoluble and infusible. Other copolymers of butadiene such as the emulsion polymers and copolymers and the mass polymers and copolymers all are either insoluble in linseed oil, or the bodying step does not approach satisfactory homogeneity, and accordingly they cannot be satisfactorily incorporated into linseed oil; whereas the present polymer not only is thermo resistant, and does not depolymerize upon heating, but is both soluble in and heat-bodyable in linseed oil, tung oil, oiticica oil, dehydrated castor oil, perilla oil, soya oil, fish oil, chia oil, hempseed oil, and the like; and, in addition, the mixture, when heat bodied, remains compatible with the lighter solvents, both the petroleum hydrocarbons, turpentine, and the like.

Accordingly, the process of the invention heat bodies a high diene copolymer, either alone or in solution, in a heat bodyable oil; and bodies the polymer, or the oil and polymer simultaneously to yield a varnish or paint base. Other objects and details of the invention will be apparent from the following description:

The polymer member of the product of the present invention is a high molecular weight copolymer of a multi-olenfinic material and a mono-olefinic material which is copolymerizable with the multi-olefinic material under the reaction conditions. For the multi-olefinic material, butadiene is the preferred component, but any of the multi-olefins having from 4 to 12 or 14 carbon atoms per molcule are usable, including such substances, in addition to butadiene, as isoprene, piperylene, 2-methyl pentadiene, cyclopentadiene, dicyclopentadiene, dimethyl fulvene, cyclohexadiene, chloromethyl-butadiene, dimethyl butadiene, myrcene, dimethallyl, vinyl cyclohexene, hexadiene, 1-5, and the like. For the copolymerizable mono-olefinic material, the preferred substance is the 8 carbon atom compound known as "dimer" or diisobutylene which may be identified chemically as 2,5 dimethyl hexene-1 and -2. Alternatively, such substances as 2 methyl pentene-1, and 2,5 dimethyl hexene-2, the normal butenes, isobutylene, the normal pentenes, the normal hexenes, 2 methyl hexene-1, propylene, isobutylene tetramer and trimer, as well as dimers, trimers and tetramers of the other olefins listed, undecylene, decylene, dodecylene, tetradecylene, octadecylene, trimethyl ethylene, tetramethyl ethylene, cyclobutene, cyclopentene, methyl cyclopentene, cyclohexene, indene, styrene and methyl styrene, chloro styrene, dichlorostyrene, vinyl aromatics, vinyl ethers, dihydronaphthalene, vinylidene chloride, vinylidene fluoride, vinyl fluoride, vinylidene chlorofluoride, methallyl chloride, tetra fluoro ethylene, the unsaturated nitro aliphatics and aromatics, and the like, may be used.

The polymerization mixture may be prepared from one or more of the multi-olefinic material in major proportion with one or more of the mono-olefinic materials in minor proportion.

The mixture of olefinic materials is cooled to a temperature somewhat below room temperature. The preferred temperature is about 0° C. or slightly below, the preferred range being from about +10° C. to about −40° C., although with some mixtures, and for some purposes, much lower temperatures down to −164° C. may be used. The reduction in temperature is conveniently obtained by refrigerating jackets upon the storage tank for the mixed olefins and upon the reactor. For such refrigerating jackets, any convenient refrigerant may be used including such substances as liquid butane, liquid propane, liquid ethane, liquid or solid $CO_2$; or, on occasion, even liquid ethylene or liquid methane. In addition, such substances as ammonia, the various fluorine substituted hydrocarbons, sulfur dioxide, and the like, may be used.

In some instances, internal refrigerants may be used, the refrigerant being mixed directly with the olefinic polymerizaate. For this purpose, such substances as liquid butane, liquid propane, liquid ethane or liquid ethylene, liquid or solid carbon dioxide, and the like, may be used. In some instances, the low boiling fluorinated hydrocarbons may be used, especially when insolubility or non-solution of the olefinic material is desired. Similarly, methyl chloride or the diene such as butadiene itself may be used.

For the polymerization catalyst, a Friedel-Crafts catalysts, as shown by N. O. Calloway in his article on "The Friedel-Crafts Synthesis" printed in the issue of "Chemical Reviews," published for the American Chemical Society at Baltimore, in 1935, in volume XVII, No. 3, the article beginning on page 327, the list being particularly well shown on page 375, may be used, preferably in solution in a low-freezing, non-complex-forming solvent. The solvent is desirably liquid at temperatures below 0° C., thereby being low-freezing, and boils away from the dissolved catalyst with only a minor elevation in temperature, no more than a fraction of a degree, thereby being non-complex-forming. The preferred catalyst is aluminum chloride, with, for second choice, such substances as boron trifluoride and titanium tetra chloride as well as the hydrocarbon soluble, aluminum halides, such as aluminum chloro bromide or aluminum alkoxy halide, and the like.

The preferred catalyst solvents are such substances as ethyl or methyl chloride, carbon disulfide or the low boiling hydrocarbons such as liquid propane, liquid butane, liquid pentane, liquid hexane, and in some cases benzene and other aromatics, as well as mixed alkylaryl hydrocarbons, and the like, depending upon the polymerization temperature and the polymerization catalyst.

The catalyst is preferably used in substantially saturated solution. For this purpose, ethyl chloride is conveniently usable since the saturated solution contains from 5 to 7% of aluminum chloride.

It is highly desirable that the liquid catalyst be delivered into the body of the cold olefinic material and it is important that as little as possible of the catalyst be delivered into the gas space above the cold reaction mixture. This gas space contains vapors of butadiene, but no significant amounts of diisobutylene vapors because of the much higher boiling point of the diisobutylene. It is found that the catalyst under these circumstances will polymerize the butadiene alone from the vapor condition into the so-called "popcorn" type of polymer which is a butadiene polymer which is insoluble and infusible and useless for the purposes of the present invention. For similar reasons, gaseous boron trifluoride is not useful since it boils within the reaction mixture along with the butadiene and causes precipitation of a low-grade of polymer on the reactor walls and other troublesome spots.

Thus, the polymerization reaction is preferably conducted by delivering the catalyst solution in the form of a fine, high pressure jet into the body of the rapidly stirred olefinic material. It is desirable that the catalyst solution be dispersed into the olefinic material as rapidly and effectively as possible to avoid "hot spots" of unduly intense polymerization in the liquid. The polymerization reaction proceeds promptly to yield the desired polymer, which is a light yellow to water-white solid resin according to the purity of the reactants and the freedom from metallic contamination.

The molecular weight of the resulting polymer (or Staudinger number) may range from 1000 up to 40,000 or 50,000 or higher, up to several hundred thousand, and the iodine number may range from about 30 to 275 or higher, depending upon the proportion of multi-olefinic and mono-olefinic material polymerized and the reaction conditions. It may be noted that the polymer does not necessarily contain the component molecules in the proportion in which they are present in the mixture, especially if the polymerization reaction is halted short of 100% yield. The ratio between the proportion of substances present in the mixture and the proportion present in the polymer varies, of course, with the proportions of the two materials present in the original mixture, and also with the relative copolymerizability. Butadiene is of relatively low copolymerizability whereas isoprene, piperylene, dimethyl butadiene, especially dimethallyl, and myrcene are of relatively high copolymerizability. The octene known as "dimer" is of relatively high copolymerizability whereas the normal mono-olefins and some of the simple isoolefins are of definitely lower copolymerizability with respect to butadiene. Accordingly, a mixture of isoprene and 2 methyl pentene 1 will yield a polymer containing a higher proportion of isoprene to mono olefin than was present in the mixture, whereas a mixture of butadiene and "dimer" will yield a polymer having a higher proportion of dimer in the polymer than was present in the original mixture.

The polymerization reaction usually is arrested short of 100% yield either by stopping the delivery of catalyst, or by discharging the cold polymerization mixture into warm water. The polymer is conveniently recovered either by straining out the solid polymer from the residual reaction mixture or by volatilizing out the residual olefin and diluent in any convenient way. The solid polymer is conveniently washed on a warm double roll mill to drive out as much as possible of the catalyst solvent and residual unreacted olefinic materials, as well as to wash out as much as possible of the Friedel-Crafts catalyst.

The resulting polymer may then be heat-bodied, directly, to produce a wide range of molded articles with or without fillers, which fillers may be substantially any solid inert material including all of the paint pigments, carbon black, clay, mica, aluminum powder, silicon carbide, marble, lithopone, talc, ground cork, wood flour, organic or inorganic fibres, and the like, as well as lubricants, stabilizers, solvents and plasticizers.

Alternatively, the polymer may be dissolved in a varnish oil or drying oil such as linseed oil, or tung oil, or the oils above listed, or the like, and the oil and polymer heat-bodied simultaneously. For this purpose, temperatures in the neighborhood of 200 to 500° C. or higher are desirable and the heat treatment may be continued for from 1 to 8 or 10 hours, or more, depending upon the temperature, the polymer, the solvent oil; and the relative amounts of each. The heat-bodied material may then be "cut back" with solvent such as turpentine, petroleum naphtha, or a wide range of the newer solvents. The resulting composition is an excellent varnish which may be made quick-drying by the addition of drier catalysts such as manganese, or lead, or cobalt naphthenate, and the like. Alternatively, an excellent paint may be produced by incorporating into the heat-bodied material an appropriate pigment and filler with or without one or more appropriate oil-soluble dyes to yield an appropriately colored paint which is of high durability, reasonably quick drying, and an excellent surface covering.

These low temperature, high diene copolymers are considerably more stable and much more reactive than most of the polymers of the prior art; and they are susceptible to a relatively large number of chemical reactions without breakdown of the linear chain backbone of the polymer—that is, these diene-olefin copolymers may be chemically modified in a number of different ways.

For instance, treatment of the polymers, preferably in solution in a stable solvent such as carbon tetrachloride or petroleum naphtha, by strong acids such as sulfuric acid, yields esters which may be hydrolyzed to yield alcohols or ethers or both.

Alternatively, the polymers may be sulphonated by sulfuric acid, or nitrated by mixtures of nitric and sulfuric acids, the reaction proceeding by the elimination of water from the hydroxyl group of the acid and an active hydrogen in the polymer, either on the aliphatic chain or from an aromatic nucleus if one is present. These sulfonates and nitrates have many points in common with the simpler sulfonates and nitrates well known to those skilled in the art, and they follow generally the reactions of such sulfonates and nitrates.

Also polymers containing in the polymer an aromatic nucleus may be alkylated with alkyl or aryl-alkyl halides to yield high molecular weight compounds having many interesting and valuable properties. The aromatic nucleus may also be combined with unsaturated acids, esters, ethers, and hydrocarbons by methods which are well known to those skilled in the art.

Similarly, the polymers may be condensed with chloroform and similar organic halides, with the several sulfur chlorides, phosphorous trichloride, phosgene ($COCl_2$) and the like. The polymer also reacts readily with most of the aliphatic and aromatic acid halides. It also reacts with the ketenes, the olefin oxides, sulfur dioxide, compounds of the type of ArNCO (Ar being any aryl group). Such compounds as CO(HCl) and $CH_2O$ may also be added to the aromatic rings in the polymer by the action of Friedel-Crafts catalysts in the well known manner.

The linear chain of the polymer contains one unit of residual unsaturation for each diolefin molecule polymerized. Each of these units of unsaturation is capable of condensation with alcohols to yield ethers; and with carbon monoxide and water in the presence of boron trifluoride to yield acids. Similarly, the unsaturation in the chain may be condensed with the various organic acids, both aliphatic, aromatic, or mixed, as well as the acid chlorides, anhydrides and esters in the presence of sulfuric acid, zinc chloride, and other metallic halides to yield high molecular weight unsaturated ketones. The aliphatic unsaturation in the linear chain may also be condensed with formaldehyde to yield dioxanes and glycols. The unsaturation in the linear chain may also be condensed with the isoparaffins and with the aromatic and hydro-aromatic hydrocarbons in alkylation type of reactions. The unsaturation in the linear chain is also reactive with hydrogen sulfide and with the mercaptans; with ammonia and the amines and with the alkyl and aryl hypochlorites, as well as with hypochlorous acid.

Other substances with which the unsaturation of the linear agent in the polymer will condense include such compounds as nitrocyl chloride and nitro-mono and di-halo-amides; aliphatic and aromatic diazo compounds and a-halo-ethers to yield the various halo-ether homologues which incorporate the alpha halo-ethers. The linear chain unsaturation is also reactive with the various carbazoles; with furfuraldehyde; with $N_2O_4$; with $N_2O_5$; with phosphorous pentoxide, phosphorous pentasulfide, sulfuryl chloride, sulfonyl chlorides, and phosphoryl halides, and the like. The polymer is also reactive with maleic anhydride, which, with the diene-olefin copolymers may yield either saturated or unsaturated linear chain polymers. The polymer may also be reacted with succinic anhydride to form additional side groups on the chain.

The polymer is also reactive with the alcohols and amines (including the polyfunctional derivatives such as pentaerithritol and ethylene diamine) to yield a wide variety of modified hydrocarbon polymers which are especially useful as oil additives, components of surface coatings, molding compositions, and a wide variety of other uses.

These unsaturated hydrocarbon polymers of a major proportion of a multi olefinic material with a minor proportion of a mono-olefinic material may also be condensed with the phenols; with the cresols; with the naphthols; and with resorcinol and the like, as well as with aniline, dimethylaniline, and the other aromatic amines to yield many valuable, important, and interesting high molecular weight substances. These products may then be further modified by treatment with formaldehyde or its higher homologues, for a wide range of copolymerizing and modifying reactions. Analogous reactions may also be obtained by condensing the unsaturated hydrocarbon polymers with various of the phenol-formaldehyde or aniline-formaldehyde resins to yield still other valuable and important substances.

These copolymers of a major proportion of a multi-olefinic material or di-olefin with a minor proportion of a mono-olefinic material may be halogenated by direct halogen addition as well as by halogen substitution. The halogenated and hydro-halogenated derivatives may also be condensed with various of the aromatic hydrocarbons, such as with polystyrene, with the amines, the alcohols, and other compounds possessing an active hydrogen atom.

Hydrogenation of these unsaturated hydrocarbon polymers is also possible to produce a more stable material which is "non-drying" and useful in adhesives, surface coatings, as resin modifiers, and as lubricant additives.

When these polymers are utilized as components in paint or varnish films, or where oxidation "drying" is a factor in the utilization, the polymers may be isomerized to reduce the amount of necessary drying, by the action of heat, and the drying and isomerization may be promoted by the presence of heavy metal oxides, alkalis, metal powders, metal halides, acids, peroxides, light, nitrous acid, sulfurdioxide, sodium bisulfite and the like. Alternatively, such substances as chlorine, hypochlorous acid and hydrogen peroxide may be added to the double linkage or unsaturation of the linear chain portion of the polymer. By appropriate treatment, hydrochloride or water, or both, may be removed from the polymer to produce a conjugated system of unsaturation which confers upon the polymer many other valuable characteristics.

The isomerization conditions, such as heat, light and catalysts, may produce deep-seated changes in the polymer molecule by such reactions as cracking, dehydrogenation, depolymerization and alkylation to yield many modified products having valuable and important properties.

These polymers are also susceptible of oxidation by selenium dioxide to yield unsaturated ketones. They may also be oxidized with such agents as the various organic and inorganic peroxides, the permanganates, dichromates, as well as nitric acid and ozone to yield such compounds as the glycols, ketones, hydroxy and keto acids, and acids as such. Oxidation by mixtures of hydrogen peroxide and acetic acid yields a partially acetylated polyalcohol.

Each of these oxidized products is susceptible to a large number of further transformations. The hydroxyl derivatives may be converted to halides, acetals, ketals, amines, acetamines, alkyl and aryl esters and ethers, inorganic esters and alcoholates and the like. The ketones are readily converted to ketals, hydroxy ketones, tertiary alcohols, oximes, substituted amides and the like. The acid derivatives of the polymers likewise may be converted to esters of the alcohols, of the glycols, and esters of the other polyhydric alcohols, acid chlorides, amides, nitrites and amines.

All of the reactions outlined above are directly applicable to the production of thermoplastic and thermosetting resins, as well as surface active agents, adhesives, dyes, insecticides, resin modifiers, and a wide variety of chemical intermediates.

The following examples are presented as indicative of the scope of the invention, but they are not the only means or method of practicing the invention, and, accordingly, they are representative only.

*Example 1*

A mixture was prepared consisting of 600 parts by weight of butadiene and 400 parts by weight of diisobutylene. This material was placed in a reactor equipped with a stirrer, reflux condenser, refrigerating means, and a catalyst supply. Sufficient liquid propane, in the amount of approximately 500 parts by weight, was added to bring the temperature to approximately $-15°$ C. When this temperature was attained, a solution of aluminum chloride in ethyl chloride, in 5% concentration was added dropwise through a supply tube leading below the surface of the olefinic mixture. During the addition of the catalyst, the mixture was efficiently stirred and vigorous refluxing occurred. Additional quantities of liquid propane were added from time to time to hold the temperature at about $-15°$ C. When approximately $2/3$ to $3/4$ of the olefinic material had been polymerized, the mixture was treated with approximately 10 parts of isopropyl alcohol to inactivate the catalyst and precipitate the solid polymer. The solid polymer was separated from the residual liquid propane and unpolymerized butadiene and diisobutylene and catalyst solvent, and dried. The yield was approximately 660 parts by weight (66%) of a water-white, slightly plastic, slightly brittle, slightly tacky resin.

This resin was found to have an iodine number of 140 and an intrinsic viscosity of 0.10 (indicating a Staudinger molecular weight number of 2000 and an actual molecular weight by the Flory method of 7000). (Journal of the American Chemical Society, vol. 65, p. 372 (1943)). An analysis for carbon and hydrogen was made which indicated that the polymer contained slightly more than 50% of butadiene molecules and slightly less than 50% of diisobutylene molecules.

*Example 2*

A similar polymerization was conducted on a similar mixture, as in Example 1, but with approximately $1/3$ the amount of catalyst. This polymerization yielded only 22% of solid polymer based on the amount of mixed butadiene and diisobutylene.

The iodine number of this polymer was found to be 190, and the polymer, while water-white, was considerably softer, less brittle, and definitely more plastic than the polymer of Example 1. It was found to have an intrinsic viscosity of 0.06, indicating a Staudinger molecular weight number of approximately 1000.

*Example 3*

A mixture was prepared consisting of one part by weight of the butadiene-diisobutylene copolymer of Example 1 with 2 parts by weight of alkali-refined, heat-bodied linseed oil (having a viscosity of 36 poises). This mixture was heated at 570° F. under an inert atmosphere until it was well-bodied. A medium grade petroleum naphtha identified in the trade as "Solvesso No. 2" was then added to the bodied mixture after cooling to 400° F., sufficient being added to double the volume of the solution and make an approximately 50% solution of oil and polymer in naphtha. This solution was then filtered, hot, and approximately 0.03% of cobalt naphthenate and 0.50% of lead naphthenate (based on the original amount of linseed oil) were added. The resulting varnish type of mixture had a viscosity of 1.25 poises.

A portion of the varnish material was applied to several panels, both wood and metal, and was found to dry to a tack-free condition in less than four hours. After 48 hours of drying, a panel coated with the varnish was held in boiling, distilled water for one hour. This treatment produced a very slight blushing on the exposed portion of the panel, but this blushing disappeared within twenty minutes after removal from the boiling distilled water. A similar panel coated with the varnish, air-dried for four hours was then baked for four hours at 110° C. This treatment yielded a very hard, thin film, which, when soaked for one hour in boiling distilled water, showed no whitening nor blushing of any sort.

An enamel was prepared by grinding three parts by weight of titanium dioxide into 7½ parts by weight of the reduced cooked mixture. The resulting white enamel was reduced and applied to several panels, some of which were air-dried, and some of which were baked. The coating on these panels was found to have an excellent, fine, white color and an alkali resistance superior to the average air-dried or baked enamel films and was a suitable refrigerator or automobile finish.

This material was found to be particularly suitable for further compounding to produce marine-type paints and cement paints. It was also found to be particularly advantageous for water emulsion type of paints. The high strength, low-water absorption and other characteristics make it particularly suitable for corrosion-proof coatings; particularly in the form of liners for containers to hold chemicals, acids, alkalis, and corrosive liquids generally. It was found to be particularly useful with aluminum and bronze powders for both primer coats and finishing coats; in fact, the material is an exceedingly satisfactory base for both interior and exterior finishes of all kinds when compounded with appropriate supplemental ingredients.

Example 4

A similar varnish was prepared from the resin of Example 1 mixed with dehydrated castor oil. The mixture was prepared consisting of one part by weight of the polymer of Example 1 with two parts by weight of the dehydrated castor oil. This mixture was then heat-bodied at approximately 575° F. under an inert atmosphere until a good body was obtained, approximately five hours of heating being required. The resulting material was then cooled to about 400° F. and cut back with a medium naphtha, as in Example 3. The resulting varnish was found to be excellent as an air drying or baking varnish.

A portion of this varnish was treated with 0.03 of cobalt naphthenate and 0.05 of lead naphthenate. This varnish, when applied to panels, was found to dry tack free in less than four hours and to a firm, solid varnish coating of high strength, durability and resistance in twelve to twenty-four hours. Another portion of the varnish was applied to panels which become air dry and tack free in about four hours. These panels were then baked at 110° C. for four hours. The resulting film was of excellent strength and highly resistant under all of the varnish durability tests.

This varnish also showed a very high dielectric strength and very low dielectric loss. These characteristics make it an excellent insulating varnish. Since electrical equipment is readily soaked in the varnish, the small amount of naphtha volatilized out and the varnish baked down into it, make a strong high grade insulating coating. For such insulating purposes, the varnish may conveniently be prepared by partly bodying the resin alone for a limited number of hours at 400° F.—the time and temperature being such as to avoid incipient gelation. At this point, the drying oil is added, while the two components are still mixable and the bodying is then continued to whatever extent is desired. This procedure yields a varnish with a particularly hard surface.

Example 5

A mixture was prepared of equal parts of butadiene-diisobutylene copolymer, prepared as described in Example 1, and China-wood oil (Tung oil). This mixture was heated rapidly to 575° F. and then cooled immediately. When the material had been cooled to approximately 100° C., it was diluted with a further portion of linseed oil (coumarone-indene resin or other drying oil or the varnish resins previously mentioned could have been used). This procedure produced a varnish and, when appropriate amounts of pigment had been added, an enamel of exceptionally high alkali resistance. Another portion of this material was thinned with about one half as much linseed oil as the amount of the heated mixture and a pigment added. The resulting material was found to have exceptionally good outdoor weathering properties.

Example 6

A reduced resin was made by heating together equal parts by weight of the butadiene-diisobutylene copolymer of Example 1 and the rosin-pentaerithritol resin known as "Pentalyn" resin to a temperature of 570° F. for twenty minutes. The melt was then quenched by adding it to approximately two parts by weight of dehydrated castor oil, and the resulting mixture was then cut back with approximately an equal amount of medium grade petroleum naphtha thinner and appropriate amounts, as above indicated, of naphthenate dryers were added. The resulting varnish dried satisfactorily in four hours. Air-dried films, dried for forty eight hours, were fully resistant to immersion in 5% caustic soda solution for four days.

Example 7

A solution of the butadiene-diisobutylene copolymer of Example 1 was prepared in toluene, approximately equal parts being used. This varnish was applied to a steel panel by immersing the panel in the solution. Excess was drained off and the toluene allowed to evaporate. (Alternatively, spraying or roller coating could have been used.) The resulting film was then baked at 200° C. in a $CO_2$ atmosphere for three hours The resulting film was clear and nearly water-white with a very slight yellow tinge from the presence of contaminating iron compounds. The film was wholly insoluble in hydrocarbons, alcohols, esters and acids generally, as well as in caustic solution and concentrated sulfuric acid. In addition to metal, wood, ceramics, cloth, glass, leather, rubber, plastics may be similarly protected either by coating or impregnation.

Example 8

A similar solution to that in Example 7 was prepared and approximately 15%, based on the resin content, of diethylhexyl phthalate as a plasticizer was added. Steel panels were similarly dipped in this varnish and baked as before. The resulting film was found to be clear, nearly water-white, with only a faint yellow tinge, and the film was found to be much more resistant to chipping from impact and much more resistant to bending of the panel than the film of the previous Example 5. In addition, it was substantially as resistant to destructive agents as the film of Example 5.

Example 9

The polymer of the present invention is also highly useful as an extender for a wide range of rubber-like substances and other polymers.

The material is particularly effective for improving the properties of the butadiene-styrene copolymer prepared in emulsion, known as Buna-S; approximately ten parts of the butadiene diisobutylene copolymer per 100 parts of Buna-S being particularly useful. This amount serves as an effective and efficient plasticizer for the Buna-S and is capable of producing considerable tack in the compound, with a negligible loss of such properties as tensile strength, elongation, and the like. The following recipe was used:

| | Parts |
|---|---|
| Buna-S | 100 |
| Zinc oxide | 5 |
| Carbon black | 45 |
| Monex | 0.4 |
| Sulfur | 1.5 |
| Copolymer | 10 |

This mixture was prepared by placing the Buna-S and copolymer on double-roll mill. It was found that as soon as the two materials began to mix, a very marked improvement in plasticity of the Bunas occurred, greatly speeding and facilitating the compounding. The zinc oxide, carbon black and sulfur were then added and well milled in. The Monex (which is tetramethyl thiuram monosulfide) was added near the close of the milling operation but was well milled in.

Test slabs were cured at 287° F. for forty-five minutes, and test specimens cut from them. These test specimens showed a tensile strength of 2250 pounds per square inch; a modulus at 300% elongation of 730 pounds per square inch; and an elongation at break of 630%. In addition, the uncured polymer plied readily because of the improved tackiness. Also, the material was much more easily calendered onto fabric and much more easily extruded than was possible with the compound lacking the copolymer.

Similar compounds were made with natural rubber (caoutchouc), the butadiene acrylonitrile emulsion polymer, polychloroprene, and other similar synthetic rubber substitutes, and in all of these the copolymer was found to ease and improve the compounding process, to increase the tackiness, and to decrease the modulus with minor reductions only in tensile strength and usually a substantial increase in elongation at break.

Example 10

A mixture of the copolymer of the present invention with linseed oil or other heat-bodiable or drying oil is highly useful as an elastic cement, with such materials as ground cork, fabric, various fibers and the like.

A mixture of equal parts of the butadiene-diisobutylene copolymer, prepared as in Example 1, with oxidized linseed oil was prepared and heat-bodied briefly. The material was then intimately mixed with an approximately equal weight of ground cork, the mixture being prepared in a Werner and Pfleiderer type kneader. The mixture was then spread on a sheet of rough canvas, using rolls and a doctor-knife. The mixture was then baked, to heat body and set both the linseed oil and the resin, into a thick, firmly adherent layer. The material was then turned over and the canvas backing given a coating of a similar copolymer-linseed oil mixture which had been cut back with solvent naphtha, as above outlined. The resulting material was an excellent grade of solid-color linoleum.

Other similar mixtures were prepared with the addition of various types of pigment, some having chrome green as a pigment, still others having rouge as a pigment, still others having lead carbonate as a pigment, and so on. These compounds were sheeted out and cut into patterned shapes and placed on rough fabric (burlap type) in the way in which figured linoleum is commonly prepared. The various sections were pressed against the linoleum and the whole given a coat of clear copolymer containing varnish, then baked to set the linseed oil, and heat body the copolymer resin, thereby yielding an excellent grade of pattern linoleum which made a durable, efficient, satisfactory floor covering.

Example 11

A copolymer was prepared, as outlined in Example 1, utilizing 55% of butadiene and 45% of diisobutylene. The finished dry resin was placed in a closed mold and heated to 290° C. for fifty minutes. This procedure yielded a clear, faintly yellow, molded article which was extremely tough and insoluble in all the common solvents and unattacked by strong caustic solution or concentrated acids.

Another portion of the same resin was pulverized, mixed intimately with ferric oxide (rouge) and the mixture placed in a mold which was then closed under hydraulic pressure and heated to 290° C. for the same fifty minutes. When the mold was opened, there was removed from it a solid, tough, molded, durable article which was opaque, with a good maroon-red color, which also was entirely insoluble in common solvents and unattacked by strong caustic solution or concentrated acids.

Still another portion of the same polymer was heated in the kneader and mixed with cotton linters until a thoroughly homogeneous material was obtained. This material was then compressed in a moderately warm mold to form a "biscuit" in which the particles of resin were slightly adherent. The "biscuit" was then placed in a mold which was closed by hydraulic pressure and heated to 290° C. for fifty minutes. In this instance also, a strong, tough, durable material was obtained.

Still another portion of the resin was dissolved in light naphtha and a quantity of spirit soluble dye added. The naphtha was then volatilized out by the use of a kneader, heated to approximately 110° C. The naphtha-free dyed resin was then placed in a mold which was closed under hydraulic pressure and heated at 290° C. for fifty minutes. The mold was then opened and the article removed and found to be a clear, colored structure which also was highly resistant to solvents, alkali and the like.

While the above examples show only a limited number of pigments and fillers in combination with the resin, all of the ordinary paint and resin pigments and fillers are usable. It will be further observed that the thermosetting operation may be conducted in two or more steps, a partial heat hardening being obtained first, which does not insolubilize the polymer nor destroy its thermo plasticity. Thereafter, a further heating or bodying process may be applied to complete the thermosetting. The polymer is tough, but not brittle; instead, it is highly suitable for machining operations generally. It may be turned in the lathe, drilled, tapped, threaded, milled, ground, sawed or polished, or given other forming treatments of the type which are applied to metals and other plastic or cellulosic material.

*Example 12*

The polymer prepared as in Example 1, has many interesting properties, among which is a powerful adhesiveness.

A portion of the polymer prepared as in Example 1 from a major proportion of butadiene and a minor proportion of diisobutylene was dissolved in xylene to produce a solution containing 60% of the solid polymer. This solution was quite thick and viscous, with an excellent body. Coatings of the solution were spread on two thin pieces of wood, and the xylene was allowed to evaporate. When most of the solvent had evaporated, the two pieces were placed with the coated surfaces in contact and cured under pressure for three hours at a temperature of 295° F., the pressure being approximately 100 pounds per square inch. At the end of this time the wood was removed and found to be firmly cemented together and the cement joint was not weakened or separated by steaming nor by bending the wood, nor by sawing, showing that the heat cyclicized polymer made a very strong permanent bond.

The same reaction was found to occur with other substances. Coatings of the polymer solution as above prepared were applied to multipart insulators, the respective parts were assembled and baked at 295° F. for approximately three hours. The heat cyclicized polymer was found to be very firmly adherent to the ceramic material of the insulators. High dielectric strength and low dielectric losses produced a highly efficient and satisfactorily assembled insulator.

A further portion of the cement was diluted to about 35% concentration with additional xylene and was used for the cementing of cloth and paper to metal surfaces and glass surfaces. In each instance the cloth or paper and the glass or metal were given respective thin coats of the cement, the solvent was allowed to evaporate and the coated surfaces were placed together; in some instances under pressure, in some instances merely supported in proper position, and the polymer was then heat cyclicized at convenient temperatures. In each instance a strong, permanent bond was obtained, which not only was stronger than the paper and cloth, but was highly resistant to solvents, acids and alkali.

A similar test showed that the polymer so applied and heat cyclicized is an excellent adhesive for attaching leather to metal or glass or wood or ceramics and, in fact, the polymer is adherent to almost any solid body.

The polymer was found to be an excellent adhesive for attaching rubber—both caoutchouc and the several Buna type polymers—to metal. A sufficient cementing action was obtained by the amount of heat required for the ordinary vulcanization of rubber, especially in the absence of the super accelerators.

A very high-grade paint brush was prepared by treating the butt of a bundle of bristles with the copolymer resin, prepared as in Example 1, dissolved in the same solvent, supporting them in a metal band, against the end of a wooden handle and heat cyclicizing the polymer in the assemblage, as above indicated. The resulting structure was found to be an excellently coherent, unitary body of bristle, metal band and wooden handle, much superior to the ordinary "rubber-set" brush.

Similarly, the polymer was found to be highly efficient for the cementing together of "glass-wool" fibers for heat insulating layers. Similarly, the polymer is an excellent adhesive for the making of abrasive wheels, abrasive blocks and the like, and also paper-coated adhesives. The high strength, high resistance to heat, solvents, acids and alkali, characteristic of the heat-bodied polymer, make it an extremely satisfactory adhesive for all uses when the materials to be cemented together must withstand temperatures ranging from 200 to 300° C.

*Example 13*

The polymer prepared as in Example 1, although not a "rubber," has in it sufficient unsaturation to permit of reactions which are in some ways analogous to those of the vulcanization of rubber. A mixture was prepared consisting of ninety parts of the butadiene-diisobutylene copolymer, prepared as in Example 1, with ten parts of sulfur. The material was placed in a mold under moderate pressure and heated to 200° C. for ten minutes. This resulted in a rapid hardening of the polymer and there was obtained a molded article of high strength and good texture and high solvent and acid and alkali resistance. The sulfur-copolymer combination is, however, more brittle than the polymer which is merely cyclicized by heat, although the brittleness is less than is characteristic of hard rubber.

Similar reactions were obtained with sulfur chloride and also with dinitroso benzene and its various derivatives; with tetramethyl thiuram disulfide; with the analogous compound tetramethyl thiuram tetrasulfide; with selenium diethyl dithio carbamate; with benzo-dithiazole disulfide; with m-dinitrobenzene; and with trinitro-benzene.

These compounds are representative of curing agents generally. In addition, the polymer is readily reactive with paraquinone dioxone in a similar curing reaction.

These examples show another valuable and important use of the polymer.

*Example 14*

A mixture was prepared consisting of approximately equal parts by weight of asbestos fibers and the butadiene copolymer prepared as in Example 1. The polymer was pulverized and the powder mixed with the asbestos fibers and the mixture placed in a mold which was then closed under moderate pressure and heated to 250° C.

for approximately three hours. This treatment cyclicized the polymer into a strong, hard, highly heat-resistant solid which bound the asbestos fibers firmly together and yielded a very high grade electrical insulating material, which was excellently suited, because of its high strength, high heat resistance and high electrical properties, to the production of such materials as brush holder insulation, commutator insulation, including both segment spacers and end rings, especially for small motors; and many other electrical uses. It may be noted that the density and flexibility of this mixture may be modified by the pressure under which the material is heat treated, since a heavy pressure compacts the material to a greater extent than a lighter pressure; a heavy curing pressure yields a very solid material, whereas a light curing pressure yields a material which is more or less porous and much more flexible than the dense material.

Asbestos tapes were soaked in a polymer solution in xylene, the solvent evaporated and the tapes used for the insulation of large motors and generator rotors. When the assemblage was complete, the structure was heated to 290° F. for a sufficient time to make sure that all of the polymer was at least partially heat cyclicized. The resulting insulation was found to be of phenomenally high strength and to show a heat resistance superior to any other organic insulating material. It was found possible to operate electrical apparatus so insulated at temperatures ranging from 250° F. to 300° F. for unlimited lengths of time; since such temperatures served merely to conplete the cyclicization of the polymer and did not result in any heat breakdown or depolymerization. It appears that prolonged heating to at least 450° F. is required before any perceptible heat breakdown occurs, and the unlimited operating temperature lies somewhere between 290° F. and 400° F.

The mixture is not limited to asbestos fibers but may contain, in addition, substantial quantities of pulverized or granulated slag.

A very valuable and interesting material may be prepared from mixtures of the powdered polymer with graphite. This material is not particularly useful for electrical insulation purposes unless it contains less than 10 to 15% of graphite, since the electrical resistance and breakdown resistance are not sufficiently good. However, compositions of good strength, when cured, can be made with as much as 65% to 80% of graphite; and at these higher values the graphite shows an extremely interesting and valuable lubricating effect. The high strength and high heat-resistance of the polymer with the lubricating capacity of the graphite makes such mixtures extremely valuable for self-lubricating bearing sleeves, which are particularly valuable in small motors; in clutch bearings, and the like.

By the addition of softening and flexibilizing agents, such as linseed oil or other of the drying or baking oils, to the polymer, and mixing in asbestos fibers, excellent brakeband mixtures are prepared, using, for example, fifty parts to seventy parts of asbestos fiber, forty parts to fifty parts of the copolymer of the present invention, and ten parts to thirty parts of linseed oil. This mixture may be sheeted out, cured and riveted to the metal brakebands, in which service it shows a very high durability and an excellent service life. Alternatively, one side of the sheeted-out mixture may be coated with a layer of the polymer containing a lesser amount of the drying oil and the whole mixture may then be cured in contact with the metal brakeband, utilizing the adhesive properties of the polymer to hold the asbestos fibers firmly to the metal brakeband. This construction is highly efficient and satisfactory, provided sufficient cooling by the use of cooling fins and the like is provided, so that the brakeband temperature does not exceed 400 to 450° F.

The polymer may similarly be mixed with a fiber such as sisal or corn fiber or other crude fiber, either in the form of the powdered resin or in the form of resin in solution in naphtha. Curing of the polymer cements the fibers firmly together, and, by the use of from 3 to 10% by weight, of polymer in the composition, an excellent insulating board is obtained. If the mixture is prepared with a larger proportion of polymer and cured under pressure, a very strong wood substitute is obtained which can be sawed, planed and drilled with about the ease of ordinary wood. A relatively light pressure on coarse fiber yields a board which may be softer than cork pine; whereas a relatively high proportion of polymer and a relatively high curing pressure may yield a board having about the strength and working properties of oak or maple; and still higher pressures may yield still harder, tougher boards.

Similarly, cloth or paper may be treated with the polymer, either from solution or in powdered form, and cured with heat and pressure to yield composite laminar material of strength and heat resistance superior to any material now known: that is, a dense, heavy, laminar board can be produced from canvas, and polymer, cured under heavy pressure, which is superior to any other available material, for such uses as cut or moulded gears, propellers, insulating bushings, airplane structural parts and the like, which are not only of high strength but are of high heat resistance as well.

*Example 15*

A mixture was prepared consisting of fifty parts by weight of paraffin, having a melting temperature of 136° F., with fifty parts of the polymer prepared as in Example 1. The mixture was prepared by pulverizing the polymer and stirring it into the molten paraffin, holding the mixture at a temperature of approximately 145° F. for a number of hours. It was found that the solution, while not particularly rapid, was complete within a reasonable time. The material was then applied to paper by two different methods: one method being to dip the paper in the molten solution, and the other to coat a warm roll with a relatively thin layer of the melted wax-polymer mixture and apply it to one side of the paper from the roll. The first procedure gave a completely saturated paper sheet; the second procedure yielded a "proofed" sheet having a coating on one side only. The resulting material showed a very much superior strength to that of paraffin alone, but was non-tacky, non-blocking, yet sufficiently thermo sensitive to permit of sealing sheets together at a relatively low temperature.

It was found that if the material was kept at a relatively low temperature, barely above the melting point of the paraffin for a limited length of time, the polymer remained in solution with substantially no change. It was further found, however, that by raising the temperature, or by the addition of cyclicization or oxidation catalysts, the polymer could be hardened while in the paraffin solution. This procedure resulted in a very substantial thickening of the solution and a substantial increase in the melting point of the mixture, as well as a valuable and useful increase in the strength and solvent-resistance of the mixture, without any tendency toward blocking, but no loss in thermo-sealing properties.

This mixture was also found to be particularly valuable for coating fruits, since it can be applied at a low temperature; and, by the addition of driers such as lead and cobalt naphthenates, a very valuable drying action could be obtained in the coating after application, resulting in an exceedingly strong coating which was elastic and wholly airtight. Fruits such as lemons, limes, oranges and apples were preserved for many months by this treatment.

*Example 16*

A sample of the butadiene-diisobutylene resin prepared as in Example 1 was heated until it had completely set-up to an insoluble, infusible resin. A dispersion of fine particles (10-100 microns) was produced in toluene and a wood panel coated. As soon as the hydrocarbon had evaporated, a hard, insoluble, chemically resistant and moisture impermeable film was formed which had excellent outdoor durability. Paints, varnishes and enamels formulated with this dispersion resin also showed excellent physical properties.

These polymers and copolymers, as well as their chemical derivatives and admixtures, are suitable as addition agents to mineral or fatty oils in concentrations of 0.01 to 10 or even 50% for increasing viscosity and viscosity index and decreasing the pour point. They may be added to greases, caoutchouc, guayule, butadiene-styrene or butadiene-acrylonitrile rubbers, polychloroprene, polyolefin sulfides, rosin, ester gum, rosin esters, phenol-formaldehyde and modified (rosin, ester gum, natural resins, drying oil) phenol-formaldehyde resins, urea-formaldehyde resins, melamine resins, halogenated rubber, cyclicized rubber, rubber hydrochloride, cellulose, cellulose esters and ethers, cellulose nitrate, cellulose acetate, ethyl cellulose, coumarone-indene resins, polystyrene, polyisobutylene and other hydrocarbon polymers, alkyd and modified alkyd resins, oil reactive ester resins, polyvinyl chloride, polyvinyl acetate, polyvinyl chloroacetate, acrylic resins, methacrylic resins, dammar, Manila, copal resins, asphalt and the like.

The mixtures and compounds disclosed above are useful in duplicate, transfer, indelible and printing inks, duplicate printing plates, matrix materials, optical lenses, transmitting and recording tapes and records, metal casting and sealing resins, arc resistant objects, dentures, modifiers for starch, dextrin, glue, gelatine, stiffening agent for fabrics, felt, straw and asbestos, absorbents after carbonization, roofing paper, shingles, and many other uses.

Thus the process and product of the invention provide a composition of matter including a heat-bodyable, sulfur-curable polymer of a major proportion of a multi olefinic material and a minor proportion of a mono olefinic material which can be hardened by heat-bodying, oxidation; or vulcanization after compounding to yield a heat-bodied varnish or paint base, or a molding composition, or a coating composition, or the like.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

The invention claimed is:
1. A surface coating composition comprising in combination a heat-bodied solid, hydrocarbon soluble, hard, low elongation polymer of a major proportion of butadiene with a minor significant proportion of isooctene prepared by the action of a Friedel-Crafts catalyst at a temperature between $+10°$ C. and $-40°$ C., said polymer having been heat-bodied at a temperature between $200°$ C. and $350°$ C., in combination with linseed oil.

2. A surface coating composition comprising in combination a heat-bodied solid, hydrocarbon soluble, hard, low elongation polymer of a major proportion of butadiene with a minor significant proportion of isooctene prepared by the action of a Friedel-Crafts catalyst at a temperature between $+10°$ C. and $-40°$ C., said polymer having been heat-bodied at a temperature between $200°$ C. and $350°$ C., in combination with linseed oil together with paint colorant material.

3. A surface coating composition comprising in combination a heat-bodied solid, hydrocarbon-soluble, hard, low-elongation polymer of a major proportion of butadiene with a minor significant proportion of isooctene prepared by the action of a Friedel-Crafts catalyst at a temperature between $+10$ C. and $-40°$ C., in combination with a drying oil.

JOHN D. GARBER.
WILLIAM J. SPARKS.

REFERENCES CITED

The following references are of record in the file of this patent:

UNITED STATES PATENTS

| Number | Name | Date |
| --- | --- | --- |
| 2,039,364 | Thomas et al. | May 5, 1936 |
| 2,374,242 | Soday | Apr. 24, 1945 |

FOREIGN PATENTS

| Number | Country | Date |
| --- | --- | --- |
| 106,371 | Australia | Jan. 26, 1939 |